July 17, 1923.
J. A. MACK
FLYTRAP
Filed April 22, 1922
1,461,925
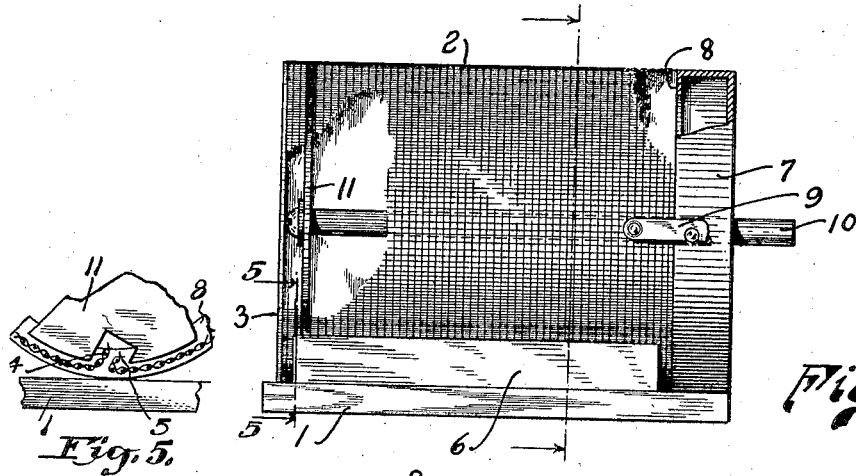
Fig. 1.
Fig. 5.
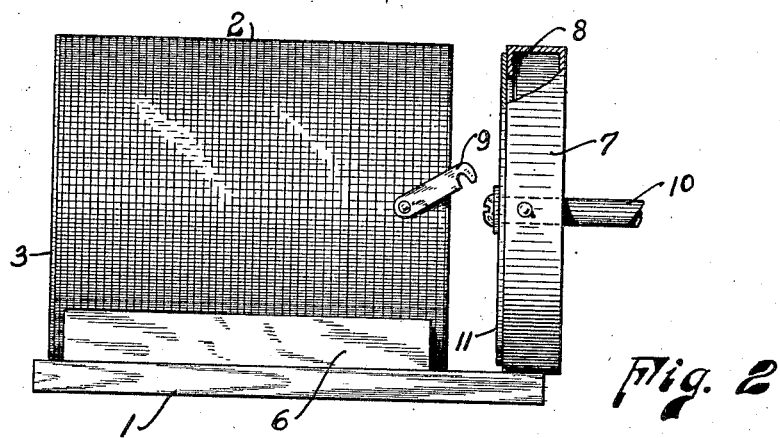
Fig. 2
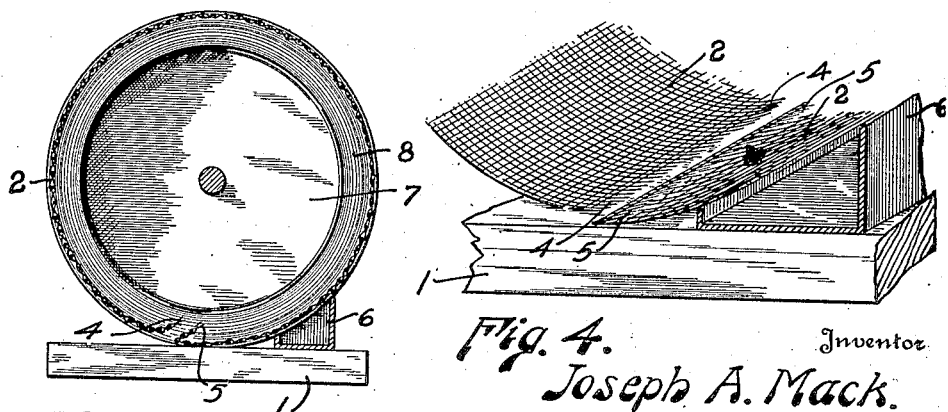
Fig. 3.
Fig. 4.
Inventor
Joseph A. Mack.
By A. J. O'Brien
Attorney Patented July 17, 1923.

1,461,925

UNITED STATES PATENT OFFICE.

JOSEPH A. MACK, OF MINTURN, COLORADO.

FLYTRAP.

Application filed April 22, 1922. Serial No. 555,982.

*To all whom it may concern:*

Be it known that I, JOSEPH A. MACK, a citizen of the United States of America, residing at Minturn, in county of Eagle and State of Colorado, have invented certain and useful Improvements in Flytraps; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to fly traps and has special reference to a fly trap of large capacity that can be cheaply made and which can be conveniently emptied.

It has become increasingly apparent in late years that the common house and stable fly is one of man's most dangerous enemies as it carries disease germs and deposits the same on food and in places from which it readily obtains entrance into the system of humans and animals. Besides the danger from disease which the fly carries, it also causes an enormous amount of annoyance and suffering.

In order to reduce the danger and annoyance due to flies, a consistent effort is being made in many places to trap them and for this purpose many different kinds of traps have been invented and are offered for sale.

It is the object of this invention to produce a fly trap that can be made almost entirely from wire screen and will therefore be very light. It is a further object to so design my trap that it can be readily made and easily assembled and to provide it with means by which it can be conveniently and quickly emptied when it is found desirable to do so.

In order to more clearly describe my invention, I shall have reference to the accompanying drawing in which—

Fig. 1 shows a side elevation of my improved trap in assembled relation parts being broken away to enable the structure to be better shown.

Fig. 2 is a view similar to that shown in Fig. 1, but showing the trap in position for removing the flies.

Fig. 3 is a transverse section taken on line 3—3 Fig. 1.

Fig. 4 is a detail on an enlarged scale showing the manner in which the entrance to the trap is formed, and Fig. 5 is a section of a fragment of the trap taken on line 5—5, Fig. 1 and shows how the cover is notched to provide space for the inwardly projecting edges.

The same reference numerals will be used to designate the same parts throughout the several views.

Numeral 1 represents a base upon which my trap is built and may be a piece of board of suitable size. The body 2 of my trap consists of a piece of woven wire screen, such as is usually employed as window screen, which is bent into a substantially cylindrical shape. One end is provided with a bottom 3 which may be made of a piece of screen or a piece of sheet metal. The edges of the screen cylinder are frayed so as to produce a short length of parallel wire ends 4 and 5. The ends 5 are bent backwardly in the manner shown in Figures 3 and 4, and the ends 4 are arranged in substantially parallel relation to ends 5 and are spaced therefrom a short distance so that a space is provided through which the flies may enter the trap. The ends 4 and 5 form what may be termed a gate which permit the flies to enter but which prevent them from leaving the trap.

I provide a feed pan 6 underneath the screen just inside of the entrance so that the odors therefrom will serve to attract the flies and to induce them to enter the trap. One end of the trap is closed by a pan 7 which has an inwardly extending flange 8 around its inner edge: This pan is held in place on the cylindrical trap member 2 by means of hooks 9 or other suitable means. Extending through a centrally located hole in the bottom of pan 7 is a handle 10 to the inner end of which there is attached a circular disc 11. When the trap is set for operation the disc 11 occupies the position shown in Fig. 1 but when it is desired to empty the trap the operator grasps the handle 10 and pulls the same outwardly and thus draws the disc 11 towards the flanges 8 of pan 7, shoving the flies into the pan and holding them therein by means of the disc 11 abutting against the flange 8. The pan is provided with a notch which is adapted to receive the edges 4 and 5. When the flies have been gathered into pan 7 the hooks 9 are released and the pan is removed in the manner shown in Fig. 2. The pan 7 can then be carried by means of handle 10 to whatever place it is desired to dump the flies when the cover disc 11 can be moved backwards and the flies dumped out, after which the pan 11 is again attached to the body portion 2 in the manner shown in Fig. 1, and the rod 10 pushed inwardly until disc 11 reaches the position shown when the tray is ready for use.

From the above it will be apparent that I have produced a fly trap that can be cheaply made that will be of light weight and which can be easily and conveniently emptied of its contents which is a very important consideration as it often happens that the trap must be emptied daily or oftener. With the arrangement devised by me the flies can be conveniently carried in the covered pan 7 and transported to any desired place where they may be immersed in a liquid before the pan is opened or the pan opened over a fire.

Having now described my invention what I claim as new is:

1. A fly-trap comprising in combination, a cylindrical container of woven wire fabric having one end non-removably secured thereto, an entrance port in the surface of said cylinder said port comprising two parallel inwardly projecting rows of wires. A pan secured removably to the other end of said container, a handle projecting through the bottom of the pan, a disc secured to the handle within the container and adapted to be moved towards the pan to form a cover therefor.

2. In a fly-trap comprising in combination a base, a cylindrical container of woven wire fabric secured to said base an entrance port extending along said container near the base, said port comprising two rows of spaced inwardly projecting wires adapted to permit the flies to move inwardly into the container but not outwardly therefrom, an end member secured to one end of the container, a pan-like member secured to the other end thereof and removably held in place thereon, said pan having an inwardly projecting annular flange, a handle extending through said pan and into the container, and a disc secured to the inner end of the handle and adapted to cooperate with said flange to form a cover.

3. In a fly-trap comprising in combination a base, a cylindrical container of woven wire fabric secured to said base, an entrance port extending along said container near the base, said port comprising two rows of spaced inwardly projecting wires adapted to permit the flies to move inwardly into the container but not outwardly therefrom, an end member secured to one end of the container, a pan like member secured to the other end thereof and removably held in place thereon, said pan having an inwardly projecting annular flange, a handle extending through pan, and into the container, a disc secured to the inner end of the handle and adapted to cooperate with said flange to form a cover, and a feed pan adapted to be placed on said base and having its upper side opening against the screen cylinder.

In testimony whereof I ffix my signature.

JOSEPH A. MACK.